United States Patent
Zhuang et al.

(10) Patent No.: US 9,830,327 B2
(45) Date of Patent: Nov. 28, 2017

(54) METHOD, DEVICE, NODE AND SYSTEM FOR MANAGING FILE IN DISTRIBUTED DATA WAREHOUSE

(71) Applicant: TENCENT TECHNOLOGY (SHENZHEN) COMPANY LIMITED, Shenzhen, Guangdong (CN)

(72) Inventors: Qianyu Zhuang, Shenzhen (CN); Chunjian Bao, Shenzhen (CN); Yihua Mai, Shenzhen (CN); Yantang Zhai, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/033,853

(22) PCT Filed: Nov. 26, 2014

(86) PCT No.: PCT/CN2014/092258
§ 371 (c)(1),
(2) Date: May 2, 2016

(87) PCT Pub. No.: WO2015/078370
PCT Pub. Date: Jun. 4, 2015

(65) Prior Publication Data
US 2016/0253362 A1 Sep. 1, 2016

(30) Foreign Application Priority Data

Nov. 29, 2013 (CN) .......................... 2013 1 0628849

(51) Int. Cl.
*G06G 7/00* (2006.01)
*G06F 17/00* (2006.01)
(Continued)

(52) U.S. Cl.
CPC ........ *G06F 17/30117* (2013.01); *G06F 11/14* (2013.01); *G06F 17/30138* (2013.01)

(58) Field of Classification Search
CPC ........... G06F 17/30303; G06F 17/3012; G06F 17/30339
(Continued)

(56) References Cited

U.S. PATENT DOCUMENTS

| | | | |
|---|---|---|---|
| 2007/0143286 A1 | 6/2007 | Kim et al. | |
| 2013/0159251 A1* | 6/2013 | Skrenta | G06F 17/30339 707/612 |
| 2014/0136485 A1* | 5/2014 | Miyoshi | G06F 3/0617 707/654 |

FOREIGN PATENT DOCUMENTS

| | | |
|---|---|---|
| CN | 101706817 A | 5/2010 |
| CN | 103092891 A | 5/2013 |
| CN | 103399941 A | 11/2013 |

OTHER PUBLICATIONS

International Search Report and Written Opinion of the ISA, ISA/CN, Haidian District, Beijing, dated Feb. 27, 2015.

* cited by examiner

*Primary Examiner* — James Trujillo
*Assistant Examiner* — John J Morris
(74) *Attorney, Agent, or Firm* — Harness, Dickey & Pierce, P.L.C.

(57) ABSTRACT

A method, a device, a node and a system for managing file in distributed data warehouse are provided. The method includes: acquiring, by a data node, a deleting instruction carrying a data block identifier, wherein the deleting instruction is sent by a management node; suspending, by the data node, the deleting instruction; and deleting, by the data node, a data block corresponding to the data block identifier after a condition is met, thereby resolving the technical issue that
(Continued)

an accidentally deleted file can not be recovered by setting a trash in the management node in some cases and ensuring the data security of the Hadoop system.

10 Claims, 9 Drawing Sheets

(51) Int. Cl.
    *G06F 17/30*     (2006.01)
    *G06F 11/14*     (2006.01)

(58) Field of Classification Search
    USPC ........................................................ 707/692
    See application file for complete search history.

METHOD, DEVICE, NODE AND SYSTEM FOR MANAGING FILE IN DISTRIBUTED DATA WAREHOUSE

The present application is the US national phase of International Application No. PCT/CN2014/092258 filed on Nov. 26, 2014, which claims the priority to Chinese Patent Application No. 201310628849.9 entitled "METHOD, APPARATUS, DEVICE AND SYSTEM FOR DELETING FILE IN DISTRIBUTED DATA WAREHOUSE", filed on Nov. 29, 2013 with State Intellectual Property Office of People's Republic of China, which are incorporated herein by reference in their entirety.

FIELD

The present invention relates to the technical field of data warehouse management, and in particular to a method for managing file in distributed data warehouse, and a device, a node and a system thereof.

BACKGROUND

Hadoop is an infrastructure of a distributed system, which may take full advantage of cluster high-speed operation and storage. Hadoop realizes a Hadoop Distributed File System (HDFS). The infrastructure of the HDFS may include a NameNode and multiple DataNodes, and the files stored in the HDFS may be divided into multiple data blocks which are stored into different DataNodes.

In order to prevent lost of a file caused by an accidental deleting performed by a user, the Hadoop sets a Trash in the NameNode. When a user deletes a file, the NameNode modifies a directory of the file to point to a directory of the Trash. When the user finds that the deletion is a misoperation and intends to recover the file, the NameNode may move the name of the file from the directory of the Trash to the original directory to recover the file. Therefore, when a client needs to view the file, the client may read the data block corresponding to the file from the relevant DataNode based on metadata of the file and a relevant mapping relation of blocks fed back by the NameNode.

The file deleted accidentally may not be recovered through the Trash set in the NameNode in some cases. For example, when a user empties the Trash, the NameNode may determine the data blocks stored in the DataNode which are included in the files in the Trash, and the NameNode may send a deleting instruction for deleting the data blocks to the DataNode, and the DataNode may delete the data blocks based on the deleting instruction. For another example, before a cluster is started, in a case that the metadata in the NameNode is deleted accidentally or is damaged, a memory of the NameNode may not include the metadata at the startup of the NameNode. After the DataNode is started, the DataNode may report data block information to the NameNode. Because there does not exist the data block information in the NameNode, the NameNode may send to the DataNode a deleting instruction for deleting the data blocks, and then the DataNode may delete the data blocks. Because the DataNode may delete directly the data blocks after receiving the deleting instruction, the deleted data blocks may not be recovered even if the user finds the accidental deleting in a short time, therefore the data security of Hadoop system is lowered.

SUMMARY

A method, device, node and system for managing file in distributed data warehouse are provided according to the embodiments of the invention.

A method for managing file in distributed data warehouse is provided according to an embodiment of the invention, and the method includes:

acquiring, by a data node, a deleting instruction carrying a data block identifier, where the deleting instruction is sent by a management node;

suspending, by the data node, the deleting instruction; and deleting, by the data node, a data block corresponding to the data block identifier after a condition is met.

A method for managing file in distributed data warehouse is provided according to another embodiment of the invention, and the method includes:

receiving from a client an instruction for deleting a specified file;

determining, by a management node, a data block belonging to the specified file stored in a data node; and sending to the data node, by the management node, a deleting instruction carrying a data block identifier of the data block, where the deleting instruction is suspended by the data node until the data node deletes the data block corresponding to the data block identifier after a condition is met.

A method for managing file in distributed data warehouse is provided according to another embodiment of the invention, and the method includes:

sending to a management node an instruction for deleting a specified file, where the instruction for deleting the specified file is utilized by the management node to determine a data block which belongs the specified file and is stored in a data node, and the management node sends to the data node a deleting instruction carrying a data block identifier of the data block, where the deleting instruction is suspended by the data node until the data node deletes the data block corresponding to the data block identifier after a condition is met.

A device for managing file in distributed data warehouse is provided according to an embodiment of the invention, and the device includes:

an acquisition module, configured to acquire a deleting instruction carrying a data block identifier, where the deleting instruction is sent by a management node;

a processor, configured to suspend the deleting instruction; and a deleting module, configured to deleting from a data node, a data block corresponding to the data block identifier after a condition is met.

A device for managing file in distributed data warehouse is provided according to another embodiment of the invention, and the device includes:

a third receiving module, configured to receive from a client an instruction for deleting a specified file;

a second determining module, configured to determine a data block which belongs to the specified file and is stored in a data node; and a second sending module, configured to send to the data node, a deleting instruction carrying a data block identifier of the data block, where the deleting instruction is suspended by the data node until the data node deletes the data block corresponding to the data block identifier after a condition is met.

A device for managing file in distributed data warehouse is provided according to another embodiment of the invention, and the device includes:

a third sending module, configured to send to a management node an instruction for deleting a specified file, wherein the instruction for deleting the specified file is utilized by the management node to determine a data block which belongs to the specified file and is stored in a data node, and the management node sends to the data node a deleting instruction carrying a data block identifier of the data block, wherein the deleting instruction is suspended by the data node, until the data node deletes the data block corresponding to the data block identifier after a condition is met.

A management node, a data node and a system including the device are also provided according to the embodiments of the invention.

In a first aspect, a method for deleting file in distributed data warehouse is provided, where the method includes:

sending, by a data node, a report to a management node, where the report includes data block identifiers of all the data blocks stored in the data node, where the report is utilized by the management node to determine a mapping from the data block identifiers to the data node based on the report;

receiving a return and acquiring from the received return, a deleting instruction carrying a data block identifier, sent by the management node;

storing the data block identifier into a delay queue; and deleting the data block corresponding to the data block identifier stored in the delay queue after a condition is met.

In a second aspect, a method for deleting file in distributed data warehouse is provided, where the method includes:

receiving, by a management node, an instruction sent by a client for deleting a specified file;

receiving a report sent by a data node and determining a mapping from a data block identifier to the data node based on the report, wherein the report includes the data block identifiers of all the data blocks stored in the data node;

determining, for each data node, the data block which belongs to the specified file and is stored in the data node, based on a prestored correspondence relation between a file and a data block identifier and the mapping from the data block identifier to the data node determined based on the report;

adding, to a return to be sent to the data node, a deleting instruction carrying the data block identifier; and storing the data block identifier into a delay queue; deleting the data block corresponding to the data block identifier stored in the delay queue after a condition is met.

In a third aspect, a method for deleting file in distributed data warehouse is provided, where the method includes:

sending to a management node, by a client, an instruction for deleting a specified file so that the management node may determine for each data node after receiving the instruction for deleting the specified file, the data block which belongs to the specified file and is stored in the data node, based on a prestored correspondence relation between a file and a data block identifier and a mapping from the data block identifier to the data node determined based on the report sent by the data node; adding, to a return to be sent to the data node, a deleting instruction carrying the data block identifier of the data block; such that the data node stores the data block identifier into a delay queue, and deletes the data block corresponding to the data block identifier stored in the delay queue after a condition is met.

In a fourth aspect, a device for deleting file in distributed data warehouse, which is applied to a data node, is provided. The device includes:

a sending module, configured to send a report to a management node, where the report includes data block identifiers of all the data blocks stored in the data node, where the report is utilized by the management node to determine a mapping from a data block identifier to a data node based on the report;

an acquisition module, configured to receive a return and acquire from the received return, a deleting instruction carrying the data block identifier sent by the management node;

a storing module, configured to store the data block identifier into a delay queue; and a deleting module, configured to delete the data block of the data node corresponding to the data block identifier stored in the delay queue after a condition is met.

In a fifth aspect, a device for deleting file in distributed data warehouse, which is applied to a management node, is provided. The device includes:

a third receiving module, configured to receive an instruction sent by a client for deleting the specified file;

a fourth receiving module, configured to receive the report sent by the data node and determine a mapping from data block identifiers to the data node, where the report includes the data block identifiers of all the data blocks stored in the data node;

a second determining module, configured to determine, for each data node, the data block which belongs to the specified file and is stored in the data node, based on the prestored correspondence relation between the file and the data block identifier and the mapping from the data block identifier to the data node determined based on the report; and a second sending module, configured to add, to a return to be sent to the data node, a deleting instruction carrying the data block identifier of the data block, such that the data node stores the data block identifier into a delay queue and deletes the data block corresponding to the data block identifier stored in the delay queue after a condition is met.

In a sixth aspect, a device for deleting file in distributed data warehouse, which is applied to a client, is provided. The device includes:

a third sending module, configured to send to the management node an instruction for deleting a specified file, such that after receiving the instruction for deleting the specified file, the management node determines, for each data node, the data block belonging to the specified file stored in the data node, based on a prestored correspondence relation between a file and a data block identifier and a mapping from the data block identifier to the data node determined by the report sent by the data node, adds, to a return to be sent to the data node, a deleting instruction carrying the data block identifier of the data block, such that the data node may receive the deleting instruction, store the data block identifier into a delay queue, and delete the data block corresponding to the data block identifier stored in the delay queue after a condition is met.

In a seventh aspect, a data node is provided. The data node includes the device for deleting file in distributed data warehouse described in the fourth aspect.

In an eighth aspect, a management node is provided. The management node includes the device for deleting file in distributed data warehouse described in the fifth aspect.

In a ninth aspect, a client is provided. The client includes the device for deleting file in distributed data warehouse described in the sixth aspect.

In a tenth aspect, a system for managing file in distributed data warehouse is provided. The system includes a client, a management node and at least one data node.

The client includes the device for deleting file in distributed data warehouse described in the sixth aspect.

The management node includes the device for deleting file in distributed data warehouse described in the fifth aspect.

The data node includes the device for deleting file in distributed data warehouse described in the fourth aspect.

In the disclosure, a data node receives a deleting instruction carrying a data block identifier from a management node, stores the data block identifier into a delay queue, and deletes a data block corresponding to the data block identifier stored in the delay queue after a condition is met, thereby resolving the technical issue that a file deleted by misoperation may not be recovered by setting the trash in the NameNode in some cases and a data security of a Hadoop system is lowered. After receiving the deleting instruction, the data node does not immediately delete the specified data block, but delays the deletion for a period, during which the user may recover the data blocks after finding that the deleting is a misoperation, thereby significantly ensuring the data security of the Hadoop system.

BRIEF DESCRIPTION OF THE DRAWINGS

To make the solutions and embodiments provided by the invention better understood by those skilled in the art, the drawings used in the invention will be briefly described in the following. Obviously, the drawings described in the following are only a few of the embodiments of the invention, and those skilled in the art may obtain other drawings according to these drawings without creative work.

DETAILED DESCRIPTION

The disclosure will be specified in the following in conjunction with drawings and embodiments, to make the object, technical solution and advantages of the invention better understood.

Figure 1:
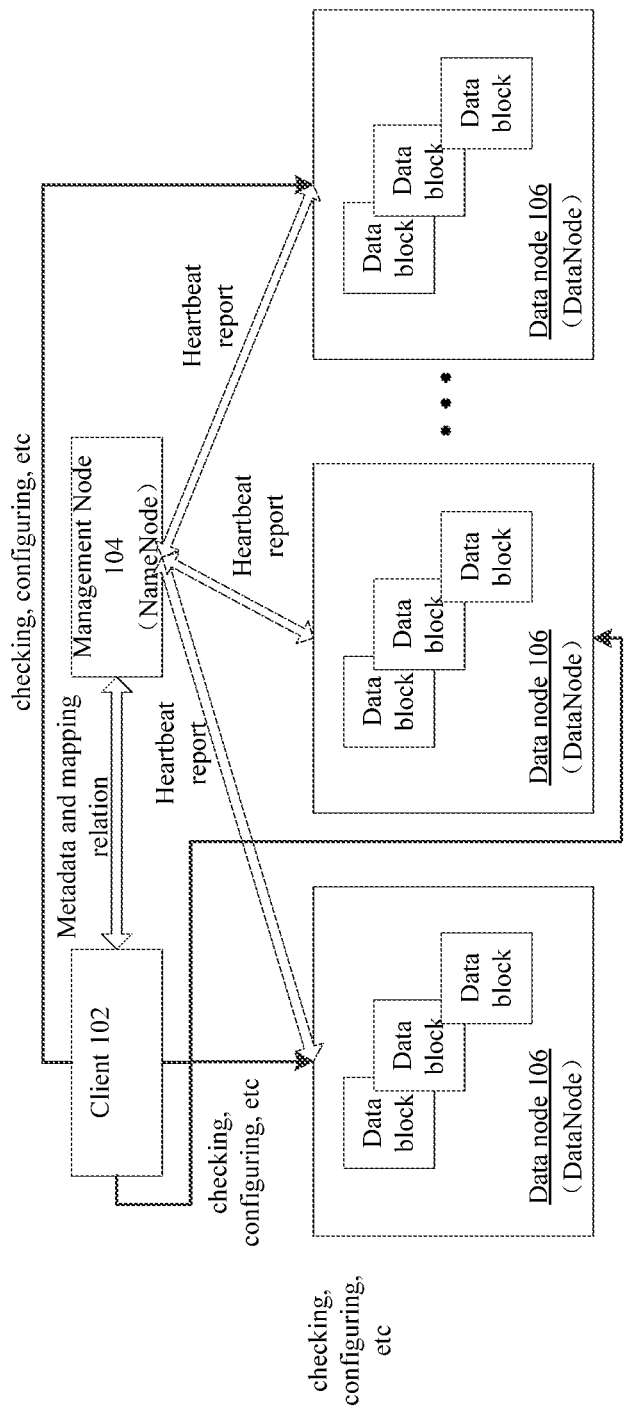
FIG. 1 is a schematic diagram of an environment in which a method for managing file in distributed data warehouse may be implemented according to an embodiment of the invention.

FIG. 1 is a schematic diagram of an environment in which a method for managing file in distributed data warehouse may be implemented according to an embodiment of the invention. The implementing environment may be, for example, a Hadoop cluster, which may include a client 102, a management node 104 and at least one data node 106.

The client 102 may send to the management node 104 or the data node 106 instructions for saving, deleting and recovering a file.

The management node 104 may be, for example, a NameNode in a Hadoop cluster, which is configured to manage a namespace of a file system. Metadata of all the files and folders in the file system may be stored in a file system tree, where the metadata may be stored into a hard disk as a file space image FSImage and an edit log file EditLog. In addition, the NameNode records, via a block mapping BlocksMAP, information of DataNode where each data block of a file resides, where the block mapping is a mapping from a data block to a DataNode, which is generated based on the information of data block reported periodically by the DataNode. The metadata refers to the information for maintaining all the files and directories of the file system, such as attribute information of the files and directories themselves (e.g., file name, directory name, parent directory information, file size, creating time, modifying time, etc.), the information relevant to the storage of the file (e.g., block division of the file, the number of file copies, information of data node where each copy resides), and the recording information for all the data nodes in a HDFS.

The data node 106 may be, for example, a DataNode in a Hadoop cluster, which stores and retrieves data blocks based on a scheduling of the client or the management node and reports periodically to the management node the information of the stored data blocks and a storage space occupied by the data blocks. The reporting process is referred to as a heartbeat report of the data node 106.

In this way, the client 102 may read from the data node 106, based on the metadata of a specified file in the management node 104 and a mapping relation between the data block and the data node 106, the data blocks of the specified file, so as to read the specified file.

Figure 2A:
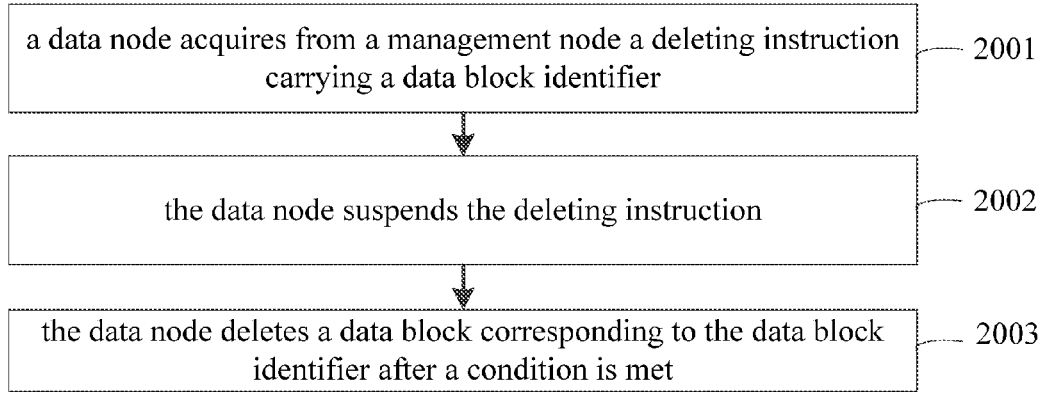
FIG. 2A is a flowchart for a method for managing file in distributed data warehouse provided according to an embodiment of the invention.

FIG. 2A is a flowchart for a method for managing file in distributed data warehouse provided according to an embodiment of the invention. For example, the method may be applied to the environment shown in FIG. 1. The method for managing file in distributed data warehouse may include the steps from Step 2001 to Step 2003 as follows.

In Step 2001, a data node acquires from a management node a deleting instruction carrying a data block identifier.

In Step 2002, the data node suspends the deleting instruction.

In Step 2003, the data node deletes a data block corresponding to the data block identifier after a condition is met.

Figure 2B:
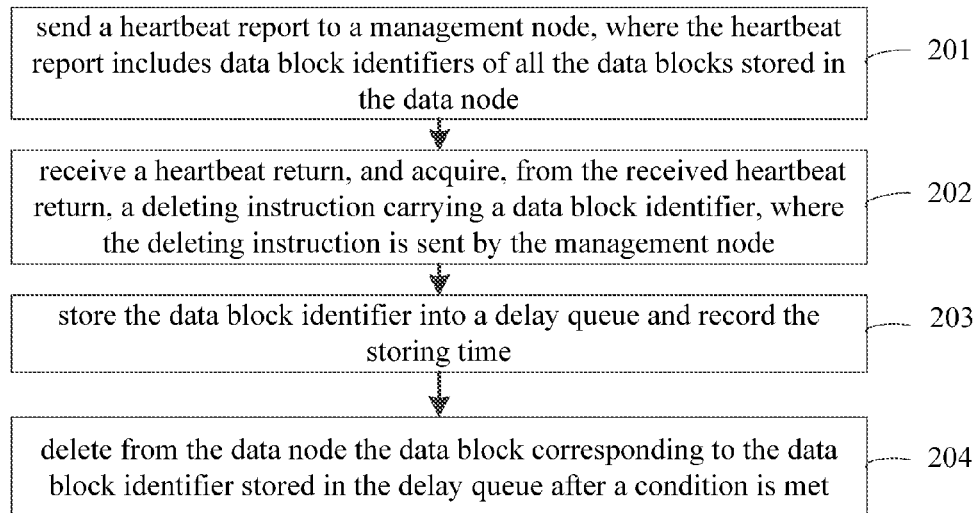
FIG. 2B is a flowchart for a method for deleting file in distributed data warehouse provided according to an embodiment of the invention.

FIG. 2B is a flowchart for a method for deleting file in distributed data warehouse provided according to an embodiment of the invention. For example, the method may be applied to the data node 106 in the environment shown in FIG. 1. The method for deleting file in distributed data warehouse may include the steps from Step 201 to Step 204 as follows.

Step 201 is to send a heartbeat report to a management node, where the heartbeat report includes data block identifiers of all the data blocks stored in the data node.

The data node sends the heartbeat report to the management node, where the heartbeat report is utilized by the management node to determine a mapping from a data block identifier to the data node.

Step 202 is to receive a heartbeat return, and acquire, from the received heartbeat return, a deleting instruction carrying a data block identifier, where the deleting instruction is sent by the management node.

The data node receives the heartbeat return, and acquires from the received heartbeat return, the deleting instruction carrying the data block identifier, where the deleting instruction is sent by the management node.

In practical application, the management node may carry the deleting instruction of the management node in the heartbeat return. Obviously, the management node may also send the deleting instruction to the data node separately.

The data node generally includes multiple data blocks, and the data blocks may belong to different files. Therefore, in a case that a file needs to be deleted, the deleting instruction needs to carry a data block identifier for indicating a data block which belongs to the file to be deleted and is stored in the data node, such that the data node may learn which stored data block needs to be deleted after receiving the deleting instruction.

Step 203 is to store the data block identifier into a delay queue and record the storing time.

The data node stores the data block identifier into the delay queue.

The delay queue may be a queue established in a memory of the data node for saving the data block identifiers of the data blocks to be deleted.

Obviously, the delay queue may be a queue set in a magnetic disk or other storage devices of the data node.

In addition, each time a data block identifier is stored into the delay queue, the time point for storing the data block identifier may be recorded.

Step 204 is to delete from the data node the data block corresponding to the data block identifier stored in the delay queue after a condition is met.

The data block corresponding to the data block identifier stored in the delay queue may be called as data block to be deleted in a delayed manner.

The data node deletes the data block corresponding to the data block identifier stored in the delay queue after a condition is met. That is, the data node may delete the data block corresponding to the data block identifier stored in the delay queue only if a specified condition is satisfied. Therefore, the data node may delete the data blocks in a delayed manner rather than immediately delete the data blocks corresponding to the data block identifiers after receiving the deleting instruction.

In a first possible implementation of the embodiment, the process of deleting from the data node the data block corresponding to the data block identifier stored in the delay queue after a condition is met includes:

deleting the data block corresponding to the data block identifier in a case that the period since the data block identifier is stored into the delay queue reaches a predetermined time threshold; or deleting from the data node the data blocks corresponding to all the data block identifiers in the delay queue in response to an emptying instruction sent by the client for emptying the data blocks corresponding to all the data block identifiers in the delay queue.

In a second possible implementation of the embodiment, after the process of storing the data block identifier into the delay queue and recording the storing time, the method further includes:

receiving a recovering instruction sent by the management node for recovering the data block corresponding to the data block identifier stored in the delay queue;

sending to the management node a heartbeat report carrying the data block identifiers of all the data blocks stored in the data node, such that the management node may create a mapping from the data block identifier to the data node based on the data block identifiers in the received heartbeat report.

In a third possible implementation of the embodiment, before the process of deleting from the data node the data blocks corresponding to all the data block identifiers in the delay queue in response to an emptying instruction sent by the client for emptying the data blocks, the method further includes:

determining the data blocks in the data node corresponding to all the data block identifiers in the delay queue;

calculating a parameter of occupation of the determined data blocks in the data node;

sending the parameter of occupation to the management node, where the client may determine after checking the parameter of occupation whether to send to the data node the emptying instruction for emptying the data blocks corresponding to all the data block identifiers in the delay queue.

In a fourth possible implementation of the embodiment, the parameter of occupation includes a delay deleting storage space and a delay deleting percentage. The process of calculating a parameter of occupation of the determined data blocks in the data node includes:

calculating a storage space occupied by the data blocks in the data node as the delay deleting storage space;

calculating a percentage of an entire storage space of the data node occupied by the delay deleting storage space as the delay deleting percentage.

In a fifth possible implementation of the embodiment, the method for deleting file in distributed data warehouse further includes:

receiving a time configuration instruction carrying a specified time length sent by the client, where the time configuration instruction is utilized in dynamic configuration of the predetermined time threshold;

updating the predetermined time threshold to the specified time length based on the time configuration instruction.

To sum up, in the method for deleting file in distributed data warehouse provided according to the embodiment of the invention, a data node receives a deleting instruction carrying a data block identifier from a management node, stores the data block identifier into a delay queue, and deletes a data block corresponding to the data block identifier stored in the delay queue after a condition is met, thereby resolving the technical issue that a file deleted by misoperation may not be recovered by setting the trash in the NameNode in some cases and a data security of a Hadoop system is lowered. After receiving the deleting instruction, the data node does not immediately delete the specified data block, but delays the deletion for a period, during which the user may recover the data blocks after finding that the deleting is a misoperation, thereby significantly ensuring the data security of the Hadoop system.

Figure 3:
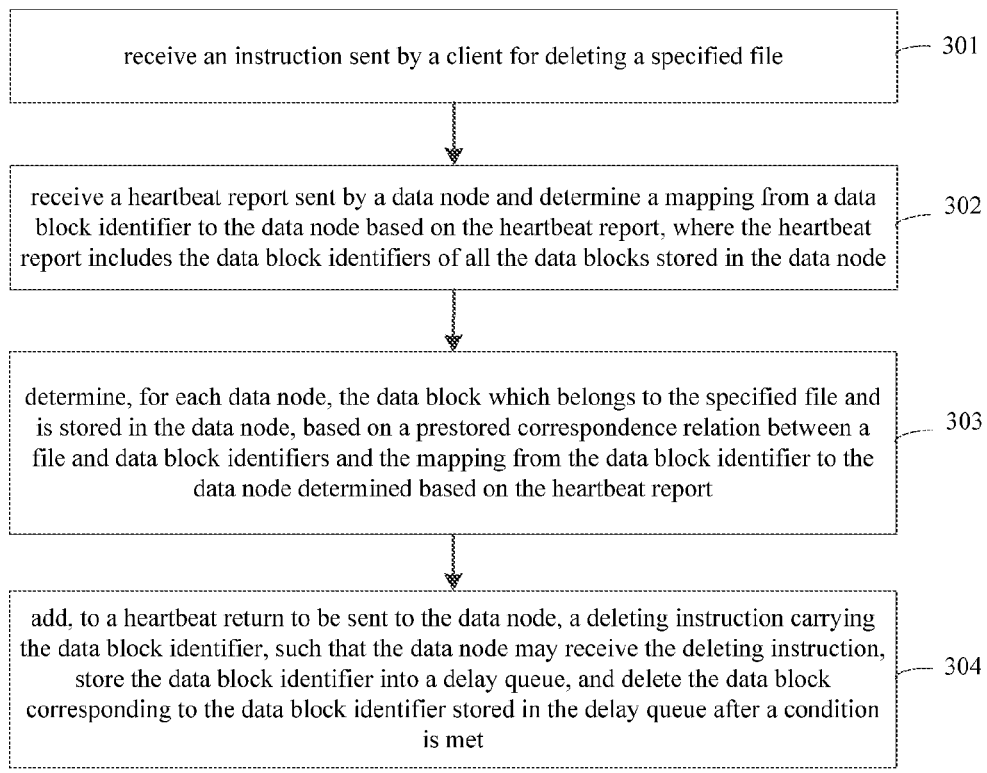
FIG. 3 is a flowchart for a method for deleting file in distributed data warehouse provided according to another embodiment of the invention.

FIG. 3 is a flowchart for a method for deleting file in distributed data warehouse provided according to another embodiment of the invention. For example, the method may be applied to the management node 104 in the environment shown in FIG. 1. The method for deleting file in distributed data warehouse may include the steps from Step 301 to Step 304 as follows.

Step 301 is to receive an instruction sent by a client for deleting a specified file;

A management node receives the instruction sent by the client for deleting the specified file.

Step 302 is to receive a heartbeat report sent by a data node and determine a mapping from a data block identifier to the data node based on the heartbeat report, where the heartbeat report includes the data block identifiers of all the data blocks stored in the data node.

The management node receives a heartbeat report sent by the data node and determines a mapping from a data block identifier to the data node based on the heartbeat report, where the heartbeat report includes the data block identifiers of all the data blocks stored in the data node.

Generally, the data node may send a heartbeat report to the management node periodically. Correspondingly, the management node may send a heartbeat return to the data node. The heartbeat report may commonly include the data block identifiers of all the data blocks stored in the data node and a storage space occupied by the data blocks, etc.

Step 303 is to determine, for each data node, the data block which belongs to the specified file and is stored in the data node, based on a prestored correspondence relation between a file and data block identifiers and the mapping from the data block identifier to the data node determined based on the heartbeat report.

The management node determines, for each data node, the data block which belongs to the specified file and is stored in the data node, based on a prestored correspondence relation between a file and a data block identifier and the mapping from the data block identifier to the data node determined based on the heartbeat report.

In practical application, a management node generally includes metadata of a file stored in a Hadoop system, where the metadata is to describe data information such as authority of the file, directory of the file, data blocks corresponding to the file. For example, the metadata in the management node may include the data information for recording the file and the data block identifiers of the data blocks included in the file. That is, the management node stores a correspondence relation between the file and the data block identifiers of the data blocks included in the file. In addition, the management node further includes a mapping relation BlocksMap, where the mapping relation includes a correspondence relation between a data block and a data node storing the data block, i.e., a mapping from the data block to the data node. The mapping relation is determined based on reported information in the heartbeat report from the data node. Generally, the heartbeat report may include the data block identifiers of the data blocks stored in the data node and a storage space occupied by the data blocks, such that the management node may create a mapping from the data block identifier in the report information to the data node.

In this way, the data block which belongs to the specified file and is stored in the data node may be determined based on a prestored correspondence relation between the file and the data block identifier and a correspondence relation between the data block identifier and the data node. For example, the correspondence relation between a specified file and the data block identifiers may be expressed as <specified file, data block 1, data block 2, data block 4>, i.e., the specified file includes the data block 1, the data block 2 and the data block 4. In a case that the report information in the heartbeat report from a certain data node includes the data block identifiers of the data block 2, the data block 3 and the data block 4, the management node may determine that the data block 2 and the data block 4 belong to the specified file and are stored in the data node.

Step 304 is to add, to a heartbeat return to be sent to the data node, a deleting instruction carrying the data block identifier, such that the data node may receive the deleting instruction, store the data block identifier into a delay queue, and delete the data block corresponding to the data block identifier stored in the delay queue after a condition is met.

The management node adds, to a heartbeat return to be sent to the data node, a deleting instruction carrying the data block identifier of the data block, such that the data node may receive the deleting instruction, store the data block identifier into a delay queue and delete the data block corresponding to the data block identifier stored in the delay queue after a condition is met.

Generally, a data node may send a heartbeat report to a management node periodically. Correspondingly, the management node may send a heartbeat return to the data node.

The management node adds to a heartbeat return to be sent to the data node, a deleting instruction carrying the data block identifier of the data block, such that the management node may determine the deleting instruction based on the heartbeat return. For example, in a case that the management node determines, via Step 303, that a certain data node stores at least one data block of the specified file, the deleting instruction to be sent to the data node may include the data block identifier of the data block, such that the data node may store the data block identifier into the delay queue after receiving the deleting instruction, i.e., the data block to be deleted may be remained temporarily, and only after a condition is met the data block corresponding to the data block identifier stored in the delay queue is deleted.

In practical application, the management node may notify the data node of the deleting instruction via the heartbeat return to the data node. Obviously, the management node may also send the deleting instruction to the data node separately.

For example, in a case that a specified file to be deleted includes multiple data blocks and the data blocks are distributed in multiple data nodes, the management node may determine for respective data nodes the respective data blocks that belong to the specified file and are stored in the respective data nodes and send respective deleting instructions to the data nodes by carrying the identifiers in the deleting instructions, such that each data node storing at least one data block of the specified file may receive a deleting instruction corresponding to the data node.

In a first possible implementation of the embodiment, the method for deleting file in distributed data warehouse further includes:

receiving a file recovering instruction sent by the client for recovering the specified file;

recovering an eligible first correspondence relation, where the eligible first correspondence relation is a first correspondence relation which is backed-up before the deleting instruction is sent and a time point for backup is closest to a time point of sending the deleting instruction, where the first correspondence relation is a relation between the specified file and a data block identifier of a data block included in the specified file; and recovering a second correspondence relation, where the second correspondence relation is a relation between the data block identifier of the data block and a data node storing the data block.

In a second possible implementation of the embodiment, the process of recovering the first correspondence relation includes:

acquiring the eligible first correspondence relation;

reading the first correspondence relation into a memory of the management node.

In a third possible implementation of the embodiment, the process of recovering the second correspondence relation includes:

sending to the data node a recovering instruction for recovering the data block corresponding to the data block identifier stored in the delay queue, so that the data node may send to the management node a heartbeat report carrying the data block identifiers of all the stored data blocks after receiving the recovering instruction.

receiving the heartbeat report sent by the data node; and creating a mapping from the data block identifier to the data node based on the data block identifiers in the received heartbeat report.

In a fourth possible implementation of the embodiment, the method for deleting file in distributed data warehouse further includes:

receiving a parameter of occupation sent by the data node, where the parameter of occupation includes a delay deleting storage space and a delay deleting percentage, where the delay deleting storage space is a storage space occupied by the data blocks corresponding to all the data block identifiers in the delay queue of the data node, and the delay deleting percentage is a percentage of the entire storage space of the data node occupied by the delay deleting storage space, such that the client may determine after checking the parameter of occupation whether to send to the data node an emptying instruction for emptying the data blocks corresponding to all the data block identifiers in the delay queue in the data node.

To sum up, in the method for deleting file in distributed data warehouse provided according to the embodiment of the invention, by sending a deleting instruction carrying a data block identifier to a data node, the data node stores the data block identifier into a delay queue, and deletes a data block corresponding to the data block identifier stored in the delay queue after a condition is met, thereby resolving the technical issue that a file deleted by misoperation may not be recovered by setting the trash in the NameNode in some cases and a data security of a Hadoop system is lowered. After receiving the deleting instruction, the data node does not immediately delete the specified data block, but delays the deletion for a period, during which the user may recover the data blocks after finding that the deleting is a misoperation, thereby significantly ensuring the data security of the Hadoop system.

Figure 4A:
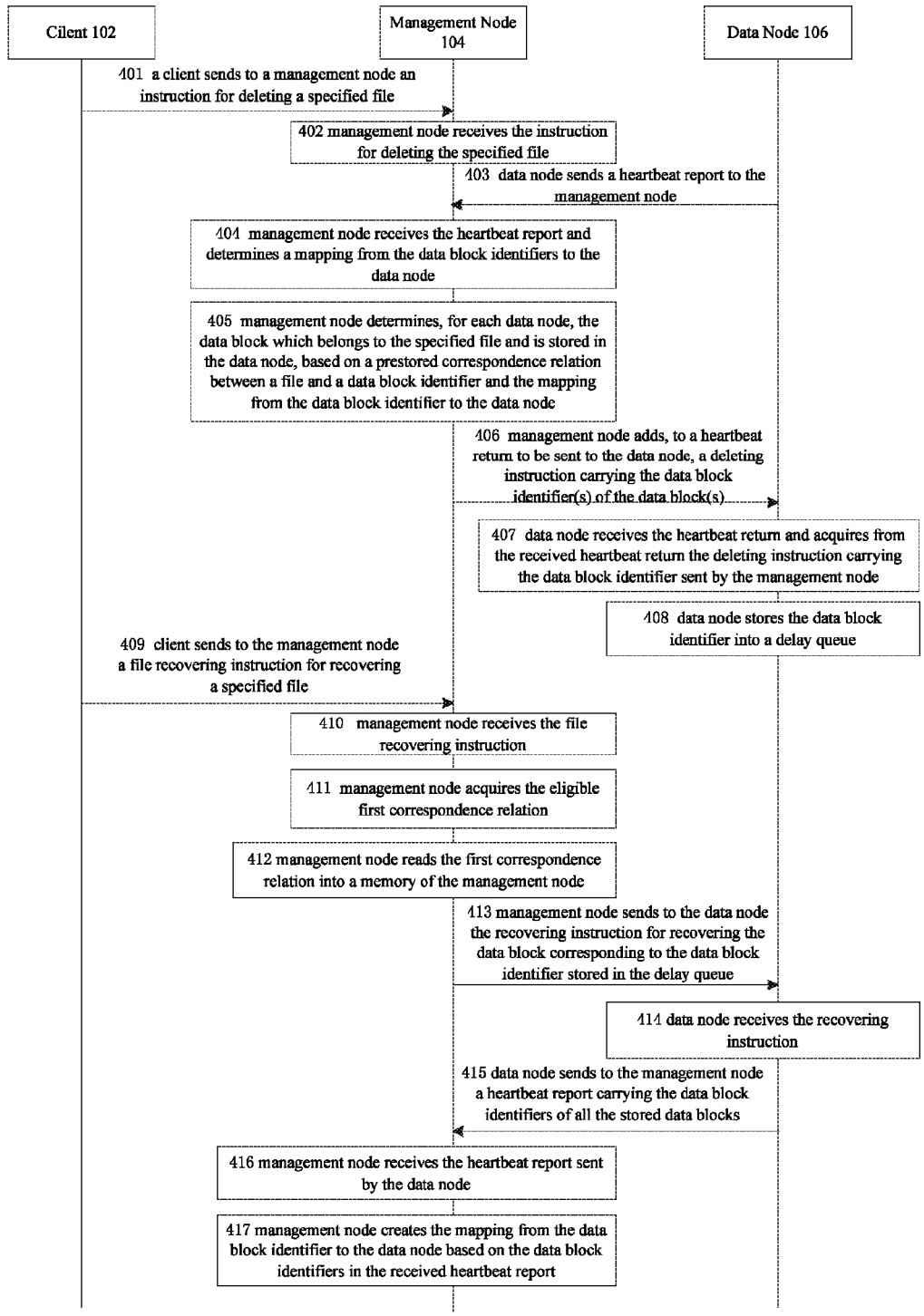
FIG. 4A is a flowchart for a method for deleting file in distributed data warehouse provided according to yet another embodiment of the invention.

In practical application, a client may send a deleting instruction to a management node to delete one or more specified files. In a case that the client finds that an operation corresponding to the instruction for deleting the specified file(s) is a misoperation, the client may send a recovering instruction to the management node within a short period of time for recovering the specified file(s) deleted by mistake. FIG. 4A shows the processes of deleting and recovering.

FIG. 4A is a flowchart for a method for deleting file in distributed data warehouse provided according to another embodiment of the invention. For example, the method may be applied to the environment shown in FIG. 1. The method for deleting file in distributed data warehouse may include the steps from Step 401 to Step 417 as follows.

In Step 401, a client sends to a management node an instruction for deleting a specified file.

In practical application, the instruction for deleting the specified file may include one specified file, two specified files or more specified files.

In Step 402, the management node receives the instruction for deleting the specified file.

In Step 403, a data node sends a heartbeat report to the management node.

The heartbeat report includes data block identifiers of all the data blocks stored in the data node.

In Step 404, the management node receives the heartbeat report and determines a mapping from the data block identifiers to the data node.

In Step 405, the management node determines, for each data node, the data block which belongs to the specified file and is stored in the data node, based on a prestored correspondence relation between a file and a data block identifier and the mapping from the data block identifier to the data node.

In practical application, a management node generally includes metadata of a file stored in a Hadoop system, where the metadata is to describe data information such as authority of the file, directory of the file, data blocks corresponding to the file. For example, the metadata in the management node may include the data information for recording the file and the data block identifiers of the data blocks included in the file. That is, the management node stores a correspondence relation between the file and the data block identifiers of the data blocks included in the file. In addition, the management node further includes a mapping relation BlocksMap, where the mapping relation includes a correspondence relation between a data block and a data node storing the data block, i.e., a mapping from the data block to the data node. The mapping relation is determined based on reported information in the heartbeat report from the data node. Generally, the heartbeat report may include the data block identifiers of the data blocks stored in the data node and a storage space occupied by the data blocks, such that the management node may create a mapping from the data block identifier in the report information to the data node.

The management node determines the data block which belongs to the specified file and is stored in the data node based on the prestored correspondence relation between a file and a data block identifier and a correspondence relation between the data block identifier and the data node. For example, it is assumed that there is one specified file and the correspondence relation between the specified file and the data block identifiers is <specified file, data block 1, data block 2, data block 4>, i.e., the specified file includes the data block 1, the data block 2 and the data block 4. If a certain data node reports via the heartbeat report that the data node includes the data block identifiers of the data block 2, the data block 3 and the data block 4, the management node may determine that the data block 2 and the data block 4 belonging to the specified file are stored in the data node. For another example, it is assumed that there are two specified files, the correspondence relation between a specified file 1 and the data block identifiers is <specified file 1, data block 1, data block 2, data block 4>, and the correspondence relation between a specified file 2 and the data block identifiers is <specified file 2, data block 3, data block 5, data block 6>. In a case that a heartbeat report sent by a certain data node includes identifiers of the data block 2, the data block 3, the data block 6 and data block 8, the management node may determine that the data node stores the data block 2, the data block 3 and the data block 6 for the two specified files.

In Step 406, the management node adds, to a heartbeat return to be sent to the data node, a deleting instruction carrying the data block identifier(s) of the data block(s).

The management node sends the deleting instruction carrying the data block identifier(s) of the data block(s) to the data node. For example, after the management node determines, via Step 403, that a certain data node stores at least one data block of the specified file, the deleting instruction to be sent to the data node may include the identifier of the at least one data block.

In practical application, the management node may notify the data node of the deleting instruction via the heartbeat return to the data node. Obviously, the management node may also send the deleting instruction to the data node separately.

Generally, in a case that a specified file to be deleted includes multiple data blocks and the data blocks are distributed in multiple data nodes, the management node may determine for respective data nodes the respective data blocks that belong to the specified file and are stored in the respective data nodes and send respective deleting instructions to the data nodes by carrying the identifiers in the deleting instructions, such that each data node storing at least one data block of the specified file may receive a deleting instruction corresponding to the data node and may delete corresponding data block after a predetermined condition is met.

In Step 407, the data node receives the heartbeat return and acquires from the received heartbeat return the deleting instruction carrying the data block identifier sent by the management node.

The heartbeat return received by the data node includes the deleting instruction, where the deleting instruction includes the data block identifier. The data node may determine, after receiving the deleting instruction, that the data block corresponding to the identifier is the data block of the file which the client intends to delete.

In Step 408, the data node stores the data block identifier into a delay queue.

The data node may store the data block identifier into the delay queue after receiving the deleting instruction, i.e., the data blocks to be deleted may be remained temporarily, and only after a condition is met the data block corresponding to the data block identifier stored in the delay queue is deleted.

In one case, the data block corresponding to the data block identifier is deleted if a period since the data block identifier is stored into the delay queue reaches a predetermined time threshold. That is, a time stamp may be recorded when the data block identifier is stored into the delay queue; in a case that the time stamp exceeds the predetermined time threshold, the data block corresponding to the data block identifier may be deleted. In practical application, the client may send to the data node a time configuration instruction carrying a specified time length, where the time configuration instruction is utilized in dynamic configuration of the predetermined time threshold. The data node receives the time configuration instruction carrying the specified time length sent by the client and updates the predetermined time threshold to the specified time length based on the time configuration instruction.

In another case, the data node deletes the data blocks corresponding to all the data block identifiers in the delay queue in a case that the data node receives an emptying instruction sent by the client for emptying the data blocks corresponding to all the data block identifiers in the delay queue. In practical application, the data node determines the data blocks corresponding to all the data block identifiers in the delay queue; calculates a storage space occupied by the data blocks as a delay deleting storage space; calculates a percentage of an entire storage space of the data node occupied by the delay deleting storage space as a delay deleting percentage; the data node sends to the management node the delay deleting storage space and the delay deleting percentage so that the management node may receive the delay deleting storage space and the delay deleting percentage, and the client may determine after checking the delay deleting storage space and the delay deleting percentage whether to send to the data node the emptying instruction for emptying the data blocks corresponding to all the data block identifiers in the delay queue in the data node; and once determines that the emptying instruction is needed, the client sends the emptying instruction to the data node. Then the data node may delete the data blocks corresponding to all the data block identifiers in the delay queue after receives the emptying instruction, i.e., the data node deletes all the data block to be deleted in delayed manner.

In Step 409, the client sends to the management node a file recovering instruction for recovering a specified file.

In a case that the client finds that the instruction for deleting the specified file is a wrong instruction, i.e., an operation corresponding to the instruction for deleting the specified file is a misoperation, the client may send a file recovering instruction to the management node for recovering the specified file.

In Step 410, the management node receives the file recovering instruction.

The management node may recover the eligible first correspondence relation and second correspondence relation after receiving the file recovering instruction, where the first correspondence relation is a relation between the specified file and the data block identifier of the data block included in the specified file, and the second correspondence relation includes the mapping from the data block identifier to the data node. For the process of recovering the first correspondence relation, reference may be made to the description of Step 411 to Step 412. For the process of recovering the second correspondence relation, reference may be made to the description of Step 413 to Step 417.

In Step 411, the management node acquires the eligible first correspondence relation.

After receiving the file recovering instruction sent by the client, the management node may acquire the eligible first correspondence relation.

The eligible first correspondence relation is a first correspondence relation which is backed-up before the deleting instruction is sent and a time point for backup is closest to the duration of sending the deleting instruction, and the first correspondence relation is a relation between the specified file and the data block identifier of the data block included in the specified file.

In practical application, the management node may backup metadata in the management node at a predetermined time interval, i.e., the metadata to be backed-up may be stored each time, where the metadata includes a file and a data block identifier of a data block included in the file. Obviously, after receiving a file recovering instruction sent by the client for recovering a specified file, the management node may acquire eligible backed-up metadata. The eligible backup metadata may be backed-up before the deleting instruction is sent and a time point for backup is closest to the time point of sending the deleting instruction. The backed-up metadata includes the specified file and a correspondence relation between the specified file and data block identifier of a data block included in the specified file.

In Step 412, the management node reads the first correspondence relation into a memory of the management node.

In practical application, the management node may read the backup metadata into the memory of the management node after being restarted. In addition, because the first correspondence relation is stored in the eligible backup metadata, the management node may read the first correspondence relation in the backed-up metadata into the memory of the management node.

Obviously, in one possible implementation, the first correspondence relation may be read into the memory as long as the management node receives the file recovering instruction sent by the client and acquires the eligible first correspondence relation rather than by restarting the management node.

In Step 413, the management node sends to the data node the recovering instruction for recovering the data block corresponding to the data block identifier stored in the delay queue.

When the client needs to read a file in Hadoop, the client needs to acquire from the management node all the data block identifiers of the file and the mapping relations between the data block identifiers and the data node, and then may read the data block of the file from the data node which stores the data block of the file. Therefore, after reading the first correspondence relation into the memory of the management node, the management node may further need to create the mappings between the data block identifiers in the specified file and the data nodes storing the data blocks. At this time, the management node needs to send to the data node the recovering instruction for recovering the data block corresponding to the data block identifier stored in the delay queue.

In Step 414, the data node receives the recovering instruction.

In Step 415, the data node sends to the management node a heartbeat report carrying the data block identifiers of all the stored data blocks.

After receiving the recovering instruction sent by the management node, the data node may send to the management node the heartbeat report carrying the data block identifiers of all the stored data blocks. Because the data block corresponding to the data block identifier in the delay queue may not be deleted physically, the heartbeat report also includes the data block identifiers of the data blocks which are to be deleted in a delayed manner.

In practical application, after receiving the recovering instruction sent by the management node, the data node may be restarted. Because the delay queue is normally stored in the memory of the data node, the delay queue may be lost when the data node is restarted, i.e., the memory of the restarted data node may no longer include the delay queue, and consequently the data block corresponding to the data block identifier included in the delay queue may not be deleted.

In Step 416, the management node receives the heartbeat report sent by the data node.

In Step 417, the management node creates the mapping from the data block identifier to the data node based on the data block identifiers in the received heartbeat report.

After a case that the specified file and the data block identifiers included in the specified file are read into the memory of the management node (i.e., the first correspondence relation is recovered), and the mapping relations between the data block identifiers and the data node are created. When the client needs to read the specified file (i.e., the second correspondence relation is recovered), the management node may feed back to the client the mapping relations between the data block identifiers corresponding to the specified file and the data node, so as to achieve the reading of the specified file.

To sum up, in the method for deleting file in distributed data warehouse provided according to the embodiment of the invention, a data node receives a deleting instruction carrying a data block identifier from a management node, stores the data block identifier into a delay queue, and deletes a data block corresponding to the data block identifier stored in the delay queue after a condition is met, thereby resolving the technical issue that a file deleted by misoperation may not be recovered by setting the trash in the NameNode in some cases and a data security of a Hadoop system is lowered. After receiving the deleting instruction, the data node does not immediately delete the specified data block, but delays the deletion for a period, during which the user may recover the data blocks after finding that the deleting is a misoperation, thereby significantly ensuring the data security of the Hadoop system.

Figure 4B:
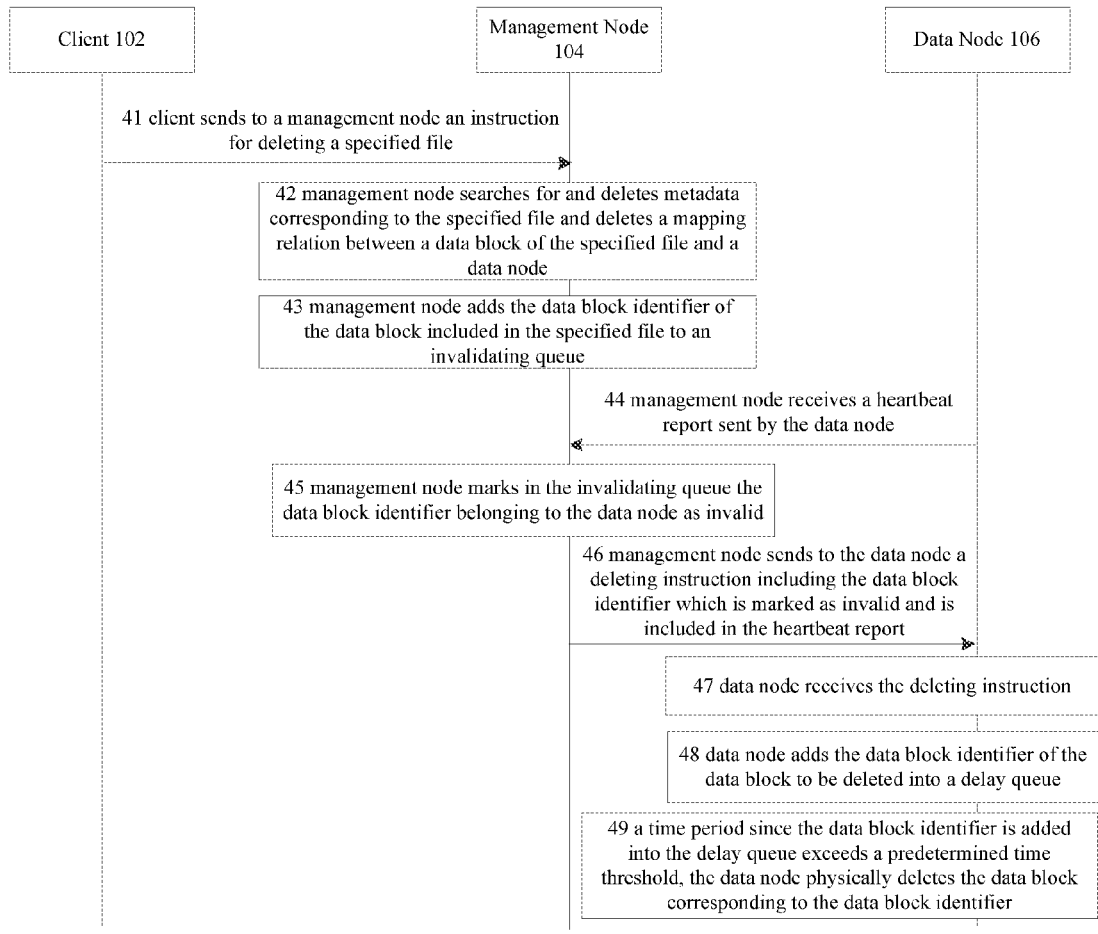
FIG. 4B is a schematic diagram of a method for deleting file in distributed data warehouse provided according to a few of embodiments of the invention.

In one possible implementation, FIG. 4B is a schematic diagram of a method for deleting file in distributed data warehouse provided according to a few of embodiments of the invention. The method for deleting file in distributed data warehouse may include the steps from Step 41 to Step 49 as follows. In Step 41, a client sends to a management node an instruction for deleting a specified file. In Step 42, the management node searches for and deletes metadata corresponding to the specified file and deletes a mapping relation between a data block of the specified file and a data node. In Step 43, the management node adds the data block identifier of the data block included in the specified file to an invalidating queue, where the invalidating queue may refers to recentinvalidateSets. In Step 44, the management node receives a heartbeat report sent by the data node, where the heartbeat report includes the data block identifiers corresponding to all the data blocks stored in the data node. In Step 45, the management node marks in the invalidating queue the data block identifier belonging to the data node as invalid, where the mark may be for example Invalid. In Step 46, the management node sends to the data node a deleting instruction including the data block identifier which is marked as invalid and is included in the heartbeat report. In Step 47, the data node receives the deleting instruction. In Step 48, the data node adds the data block identifier of the data block to be deleted into a delay queue. In Step 49, in a case that a time period since the data block identifier is added into the delay queue exceeds a predetermined time threshold, the data node physically deletes the data block corresponding to the data block identifier.

In practical application, the data node may further report to the management node a storage space occupied by the data blocks which are to be deleted in a delayed manner, such that the client may query the storage space occupied by the data blocks to be deleted in a delayed manner and a percentage of the occupied storage space in the data node, and the client may determine, based on the query, the data node in which the data blocks to be deleted in a delayed manner need to be emptied. A reference may be made to the description in FIG. 5.

Figure 5:
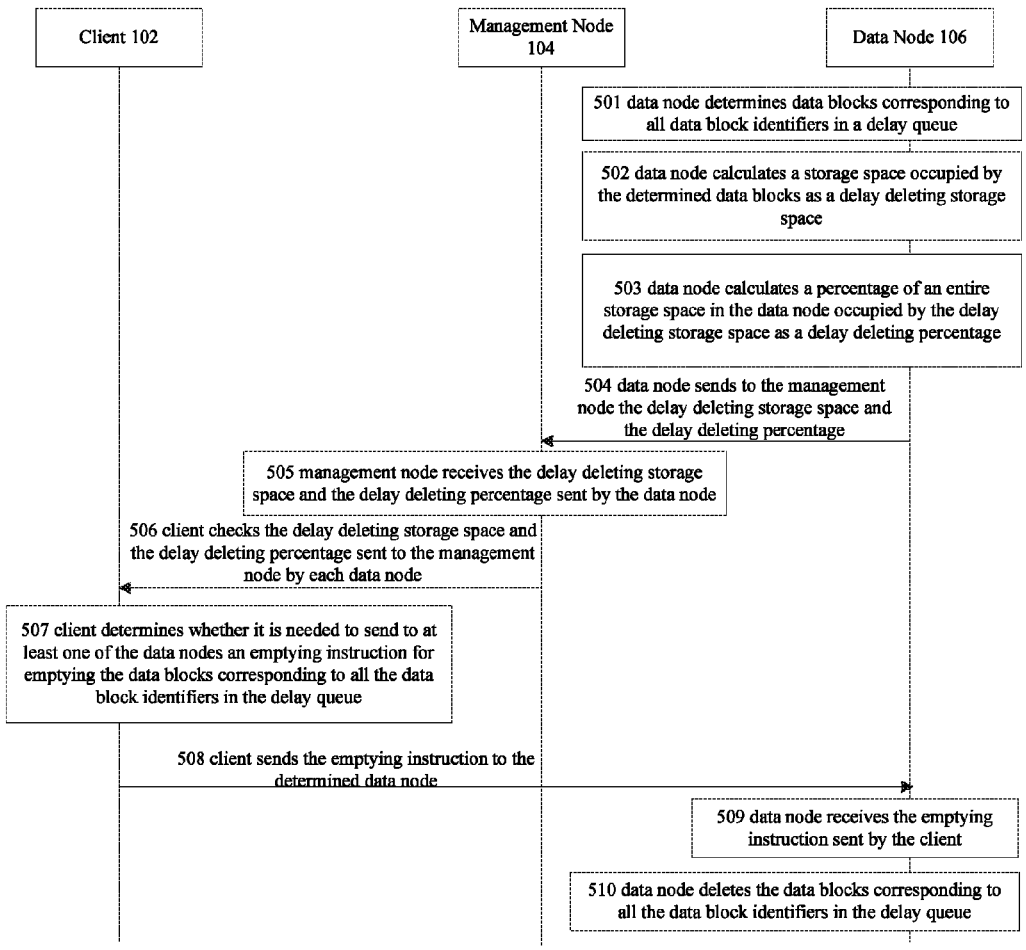
FIG. 5 is a flowchart for a method for deleting file in distributed data warehouse provided according to yet another embodiment of the invention.

FIG. 5 is a flowchart for a method for deleting file in distributed data warehouse provided according to another embodiment of the invention. For example, the method may be applied to the environment shown in FIG. 1. The method for deleting file in distributed data warehouse may include the steps from Step 501 to Step 510 as follows.

In Step 501, a data node determines data blocks corresponding to all data block identifiers in a delay queue.

In Step 502, the data node calculates a storage space occupied by the determined data blocks as a delay deleting storage space.

In Step 503, the data node calculates a percentage of an entire storage space in the data node occupied by the delay deleting storage space as a delay deleting percentage.

In Step 504, the data node sends to the management node the delay deleting storage space and the delay deleting percentage.

In Step 505, the management node receives the delay deleting storage space and the delay deleting percentage sent by the data node.

In Step 506, the client checks the delay deleting storage space and the delay deleting percentage sent to the management node by each data node.

The client may query the storage space occupied by the data blocks to be deleted in a delayed manner (i.e., delay deleting storage space) and the percentage of the occupied storage space (i.e., delay deleting percentage) for each data node in the Hadoop system, and the client may further query the data storage condition in each data node. For example, Table 1 shows a data storage condition in a data node.

TABLE 1

| field name | example | signification |
|---|---|---|
| Configured Capacity | 1.7 TB | total of the configured storage space |
| DFS Used | 96 KB | occupied storage space |
| DFS Remaining | 443.33 GB | remaining storage space |
| Delay Deleting | 0 KB | storage space occupied by the data to be deleted in a delayed manner |
| DFS Used % | 0% | percentage of the occupied storage space |
| DFS Remaining % | 25.49% | percentage of the remaining storage space |
| Delay Deleting % | 0% | percentage of the data to be deleted in a delayed manner |

Here, fields Delay Deleting and Delay Deleting % are added for the data node, which represent respectively the delay deleting storage space and the delay deleting percentage. DFS Used represents an actual physical storage space in the data node, which includes the storage space of the data block to be deleted in a delayed manner, therefore a valid storage space of the system equals to DFS Used-Delay Deleting.

The client may also check the data storage condition in each data node of the Hadoop system via Report command, where the data node is also added with fields Delay Deleting and Delay Deleting % which represent respectively the delay deleting storage space and the delay deleting percentage.

For example, a format of checking the data storage condition in each data node of the Hadoop system via Report command may be a hadoop dfs admin report as follows:
"Datanodes available: 3 (3 total, 0 dead)
Name: 10.136.138.225:50010
Decommission Status: Normal
Configured Capacity: 950674255872 (885.38 GB)
DFS Used: 730422607872 (680.25 GB)
DFS Remaining: 220251648000(205.13 GB)
DFS Delay Deleting: 2684354560 (2.5 KB)
DFS Used %: 76.83%
DFS Remaining %: 23.17%
DFS Delay Deletingi %: 0%
Last contact: Wed Nov 06 10:50:49 CST 2013
Name: 10.185.1.159:50010
Decommission Status: Normal
Configured Capacity: 950674255872 (885.38 GB)
DFS Used: 730422607872 (680.25 GB)
DFS Remaining: 220251648000(205.13 GB)
DFS Delay Deleting: 2684354560 (2.5 KB)
DFS Used %: 76.83%
DFS Remaining %: 23.17%
DFS Delay Deletingi %: 0%
Last contact: Wed Nov 06 10:50:49 CST 2013
Name: 10.185.1.160:50010
Decommission Status: Normal
Configured Capacity: 950674255872 (885.38 GB)
DFS Used: 730422607872 (680.25 GB)
DFS Remaining: 220251648000(205.13 GB)
DFS Delay Deleting: 2684354560 (2.5 KB)
DFS Used %: 76.83%
DFS Remaining %: 23.17%
DFS Delay Deletingi %: 0%
Last contact: Wed Nov 06 10:50:49 CST 2013".

In Step 507, the client determines whether it is needed to send to at least one of the data nodes an emptying instruction for emptying the data blocks corresponding to all the data block identifiers in the delay queue.

In practical application, a manager may determine whether it is needed to empty for a data node the data blocks to be deleted in a delayed manner based on the delay deleting storage space and the delay deleting storage percentage in the data node. For example, in a case that the delay deleting storage space and the delay deleting percentage in a data node is relatively large, e.g., the delay deleting storage space exceeds a first predetermined threshold, and the delay deleting percentage exceeds a second predetermined threshold, the manager may determine to empty from the data node the data blocks to be deleted in a delayed manner.

In Step 508, in a case that the client determines that it is needed to send the emptying instruction to at least one of the data nodes, the client may send the emptying instruction to the determined data node.

In practical application, the client may execute an operation of emptying the file to be deleted in a delayed manner from the data node with a command in the following format:
hadoop dfsadmin-clearDelayDeletedFile [datanodeIp]
where the datanodeIp is optional, which is an IP address of the data node to which the emptying needs to be performed. In a case that the field datanodeIp is empty, it means that all the data blocks to be deleted in a delayed manner in all the data nodes in the Hapood cluster need be emptied.

That is to say, the manager may check via the client the storage space and the percentage occupied by the data blocks to be deleted in a delayed manner in each data node, and the manager may delete the data block(s) to be deleted in a delayed manner in one or more data nodes as needed, or delete the data block(s) to be deleted in a delayed manner in all the data nodes. After determining to delete the data block to be deleted in a delayed manner in one data node, the client may send an emptying instruction to the data node.

In Step 509, the data node receives the emptying instruction sent by the client.

In Step 510, the data node deletes the data blocks corresponding to all the data block identifiers in the delay queue.

In addition, the client may send to the data node a time configuration instruction carrying a specified time length, where the time configuration instruction is utilized in dynamic configuration of the predetermined time threshold in the data node, such that the data node may update the predetermined time threshold to the specified time length based on the time configuration instruction. Therefore, after a time period since the data block identifier is stored into the delay queue by the data node reaches the predetermined time threshold, which is updated to be the specified time length, the data block corresponding to the data block identifier may be deleted.

In practical application, the client may add a switch for the delayed deletion of the file to the configuration file conf/hdfs-site.xml, such as:

```
"<property>
    <name>dfs.delaydeletion.time.sec</name>
    <value>10</value>
</property>"
```

When the variable "value" is greater than 0, the switch for the delayed deletion may be turned on. This variable may represent a delay period in the unit of second, minute or hour. When the variable "value" is smaller than 0, the switch for the delayed deletion may be turned off.

In other words, the switch for the delayed deletion may be set. In a case that the switch for the delayed deletion is set to be turned on, and a time period since the data block identifier is stored into the delay queue reaches the predetermined time threshold (i.e., the delay period set in the variable Value), the data node may empty the data block corresponding to the data block identifier. In a case that the switch for the delayed deletion is set to be turned off, determination of whether to empty the data block corresponding to the data block identifier is not made in the manner of time delay.

The Hadoop system reads the variable Value by default when being started rather than being restarted, and the user may input a command to update the configuration dynamically, the command is as follows:

hadoop dfsadmin-setDelayDeletedTimeSec value where variable Value represents an updated delay period in the unit of second, minute or hour.

It may be noted that, in practical application, a user may be aware that the accidental deleting operation is a misoperation immediately after the deleting operation, so the value may be in the unit of second.

To sum up, in the method for deleting file in distributed data warehouse provided according to the embodiment of the invention, a data node determines a delay deleting storage space and a delay deleting percentage and then send the delay deleting storage space and the delay deleting percentage to a management node, and a client may determine whether to empty the data block to be deleted in a delayed manner in some or all the data nodes after checking the delay deleting storage space and the delay deleting percentage in each data node, thereby the data nodes may be emptied selectively.

Figure 6:
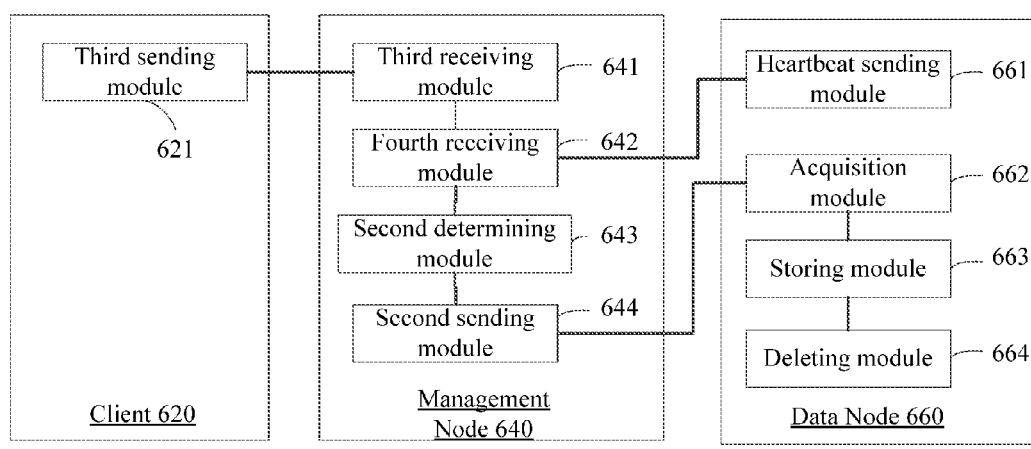
FIG. 6 is a schematic structure diagram of a system for managing file in distributed data warehouse provided according to an embodiment of the invention.

FIG. 6 is a schematic structure diagram of a system for deleting file in distributed data warehouse provided according to an embodiment of the invention. For example, the system may be implemented in the environment shown in FIG. 1. The system for deleting file in distributed data warehouse may include a client 620, a management node 640 and at least one data node 660.

The client 620 may include a device for deleting file in distributed data warehouse, where the device for deleting file in distributed data warehouse may include a third sending module 621.

The third sending module 621 is configured to send to the management node 640 an instruction for deleting a specified file, such that after receiving the instruction for deleting the specified file, the management node 640 determines, for each data node 660, the data block which belongs to the specified file and is stored in the data node, based on a prestored correspondence relation between a file and a data block identifier and a prestored correspondence relation between the data block identifier and the data node 660. The management node 640 adds, to a heartbeat return to be sent to the data node 660, a deleting instruction carrying the data block identifier of the data block, such that the data node 660 may receive the deleting instruction. The data block identifier is stored into a delay queue. The data block corresponding to the data block identifier stored in the delay queue is deleted after a condition is met.

The management node 640 may include a device for deleting file in distributed data warehouse, where the device for deleting file in distributed data warehouse may include a third receiving module 641, a fourth receiving module 642, a second determining module 643 and a second sending module 644.

The third receiving module 641 is configured to receive from the third sending module 621 of the client 620 an instruction for deleting the specified file.

The fourth receiving module 642 is configured to receive the heartbeat report sent by the data node and determine a mapping from the data block identifier to the data node, where the heartbeat report includes the data block identifiers of all the data blocks stored in the data node.

The second determining module 643 is configured to determine, for each data node 660, the data block which belongs to the specified file and is stored in the data node 660, based on the prestored correspondence relation between the file and the data block identifier and the mapping from the data block identifier to the data node 660 determined based on the heartbeat report.

The second sending module 644 is configured to add, to a heartbeat return to be sent to the data node 660, a deleting instruction carrying the data block identifier of the data block so that the data node 660 may receive the deleting instruction, store the data block identifier into a delay queue, and delete the data block corresponding to the data block identifier stored in the delay queue after a condition is met.

The data node 660 may include a device for deleting file in distributed data warehouse, where the device for deleting file in distributed data warehouse may include a heartbeat sending module 661, an acquisition module 662, a storing module 663 and a deleting module 664.

The heartbeat sending module 661 is configured to send a heartbeat report to the fourth sending module 642 of the management node, where the heartbeat report includes data block identifiers of all the data blocks stored in the data node, and the heartbeat report is utilized by the management node to determine a mapping from a data block identifier to a data node.

The acquisition module 662 is configured to receive the heartbeat return returned by the second sending module 644 of the management node 640 and acquire from the received heartbeat return, a deleting instruction carrying the data block identifier sent by the second sending module 644 of the management node 640.

The storing module 663 is configured to store the data block identifier into a delay queue and record the storing time.

The deleting module 664 is configured to delete the data block of the data node corresponding to the data block identifier stored in the delay queue after a condition is met.

To sum up, in the system for deleting file in distributed data warehouse provided according to the embodiment of the invention, a data node receives a deleting instruction carrying a data block identifier from a management node, stores the data block identifier into a delay queue, and deletes a data block corresponding to the data block identifier stored in the delay queue after a condition is met, thereby resolving the technical issue that a file deleted by misoperation may not be recovered by setting the trash in the NameNode in some cases and a data security of a Hadoop system is lowered. After receiving the deleting instruction, the data node does not immediately delete the specified data block, but delays the deletion for a period, during which the user may recover the data blocks after finding that the deleting is a misoperation, thereby significantly ensuring the data security of the Hadoop system.

Figure 7:
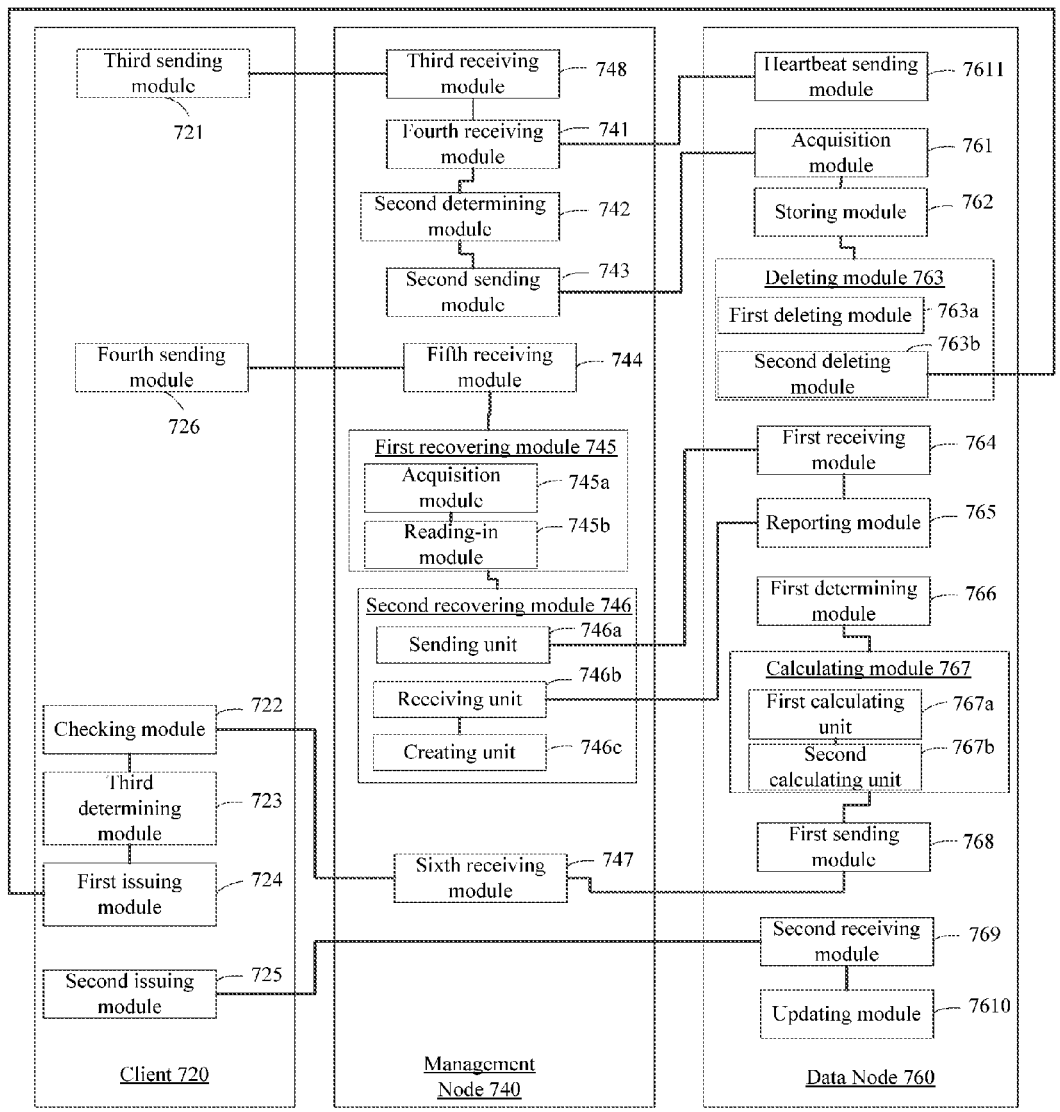
FIG. 7 is a schematic structure diagram of a system for managing file in distributed data warehouse provided according to another embodiment of the invention.

FIG. 7 is a schematic structure diagram of a system for deleting file in distributed data warehouse provided according to another embodiment of the invention. For example, the system may be implemented in the environment shown in Figure. The system for deleting file in distributed data warehouse may include a client 760, a management node 740 and at least one data node 760.

The data node 760 may include a device for deleting file in distributed data warehouse, where the device for deleting file in distributed data warehouse may include a heartbeat sending module 7611, an acquisition module 761, a storing module 762 and a deleting module 763.

The heartbeat sending module 7611 is configured to send a heartbeat report to the management node, where the heartbeat report includes data block identifiers of all the data blocks stored in the data node, and the heartbeat report is utilized by the management node to determine a mapping from a data block identifier to a data node based on the heartbeat report.

The acquisition module 761 is configured to receive the heartbeat return and acquire from the heartbeat return, a deleting instruction carrying the data block identifier sent by the management node 740.

The storing module 762 is configured to store the data block identifier into a delay queue and record the storing time.

The deleting module 763 is configured to delete from the data node the data block corresponding to the data block identifier stored in the delay queue after a condition is met.

In a first implementation of the embodiment, the deleting module 763 may include a first deleting unit 763a and a second deleting unit 763b.

The first deleting unit 763a is configured to delete from the data node the data block corresponding to the data block identifier in a case that a period since the data block identifier is stored into the delay queue reaches a predetermined time threshold.

The second deleting unit 763b is configured to delete from the data node the data blocks corresponding to all the data block identifiers in the delay queue in response to an emptying instruction sent by the client 720 for emptying the data blocks corresponding to all the data block identifiers in the delay queue.

In a second possible implementation of the embodiment, the device for deleting file in distributed data warehouse in the data node 760 may further include a first receiving module 764 and a reporting module 765.

The first receiving module 764 is configured to receive a recovering instruction sent by the management node 740 for recovering the data block corresponding to the data block identifier stored in the delay queue.

The reporting module 765 is configured to send to the management node 740 a heartbeat report carrying the data block identifiers of all the data blocks stored in the data nodes so that the management node 740 may create a mapping from the data block identifier to the data node based on the data block identifiers in the received heartbeat report.

In a third possible implementation of the embodiment, the device for deleting file in distributed data warehouse in the data node 760 may further include a first determining module 766, a calculation module 767 and a first sending module 768.

The first determining module 766 is configured to determine in the data node the data blocks corresponding to all the data block identifiers in the delay queue.

The calculating module 767 is configured to calculate a parameter of occupation of the determined data blocks in the data node.

The first sending module 768 is configured to send the parameter of occupation to the management node, where the client 720 may determine after checking the parameter of occupation whether to send to the data node 760 an emptying instruction for emptying the data blocks corresponding to all the data block identifiers in the delay queue in the data node 760.

In a fourth possible implementation of the embodiment, the parameter of occupation includes a delay deleting storage space and a delay deleting percentage, and the calculating module 767 may include a first calculating unit 767a and a second calculating unit 767b.

The first calculating unit 767a is configured to calculate a storage space occupied by the data blocks in the data node as the delay deleting storage space.

The second calculating unit 767b is configured to calculate a percentage of an entire storage space of the data node occupied by the delay deleting storage space as a delay deleting percentage.

In a fifth possible implementation of the embodiment, the device for deleting file in distributed data warehouse in the data node 760 may further include a second receiving module 769 and an updating module 7610.

The second receiving module 769 is configured to receive from the client 720 a time configuration instruction carrying a specified time length, where the time configuration instruction is utilized in dynamic configuration of the predetermined time threshold.

The updating module 7610 is configured to update the predetermined time threshold to the specified time length based on the time configuration instruction received by the second receiving module 769.

The management node 740 may include a device for deleting file in distributed data warehouse, where the device for deleting file in distributed data warehouse may include a third receiving module 748, a fourth receiving module 741, a second determining module 742 and a second sending module 743.

The third receiving module 748 is configured to receive from a client 720 an instruction for deleting a specified file.

The fourth receiving module 741 is configured to receive a heartbeat report from the heartbeat sending module 7611 of the data node 760, where the heartbeat report includes identifiers of all data blocks stored in the data node.

The second determining module 742 is configured to determine, for each data node 760, the data block which belongs to the specified file and is stored in the data node, based on the prestored correspondence relation between the file and the data block identifier and the mapping from the data block identifier to the data node determined based on the report.

The second sending module 743 is configured to add, to a heartbeat return to be sent to the acquisition module 761 of the data node 760, a deleting instruction carrying the data block identifier of the data block, so that the data node 760 may receive the deleting instruction, store the data block identifier into a delay queue and delete the data block corresponding to the data block identifier stored in the delay queue after a condition is met.

In a sixth possible implementation of the embodiment, the device for deleting file in distributed data warehouse in the management node 740 may include a fifth receiving module 744, a first recovering module 745 and a second recovering module 746.

The fifth receiving module 744 is configured to receive from the client 720 a file recovering instruction for recovering a specified file.

The first recovering module 745 is configured to recover an eligible first correspondence relation, where the eligible first correspondence relation refers to a first correspondence relation which is backed-up before a deleting instruction is sent and a time point for backup is closest to the duration of sending the deleting instruction, and the first correspondence relation is a relation between the specified file and a data block identifier of a data block included in the specified file.

The second recovering module 746 is configured to recover a second correspondence relation, where the second correspondence relation includes a mapping from the data block identifier of the data block to the data node storing the data block.

In a seventh possible implementation of the embodiment, the first recovering module 745 may include an acquisition unit 745a and a read-in unit 745b.

The acquisition unit 745a is configured to acquire an eligible first correspondence relation.

The read-in unit 745b is configured to read the first correspondence relation acquired by the acquisition unit 745a into a memory of the management node.

In an eighth possible implementation of the embodiment, the second recovering module 746 may include a sending unit 746a, a receiving unit 746b and a creating unit 746c.

The sending unit 746a is configured to send to the first receiving module 764 of the data node 760 a recovering instruction for recovering the data block corresponding to the data block identifier stored in a delay queue, so that the reporting module 765 may send to the management node 740 a heartbeat report carrying the data block identifiers of all the stored data blocks after the first receiving module 764 of the data node 760 receives the recovering instruction.

The receiving unit 746b is configured to receive the heartbeat report sent by the reporting module 765 of the data node 760.

The creating unit 746c is configured to create a mapping from the data block identifier to the data node based on the data block identifiers in the heartbeat report received by the receiving unit 746b.

In a ninth possible implementation of the embodiment, the device for deleting file in distributed data warehouse in the management node 740 may include a sixth receiving module 747.

The sixth receiving module 747 is configured to receive a parameter of occupation sent by the first sending module 768 of the data node 760, where the parameter of occupation includes a delay deleting storage space and a delay deleting percentage, where the delay deleting storage space refers to a storage space occupied by the data blocks corresponding to all the data block identifiers in the delay queue of the data node, and the delay deleting percentage refers to a percentage of the entire storage space of the data node occupied by the delay deleting storage space, such that the client 720 may determine after checking the parameter of occupation whether to send to the data node an emptying instruction for emptying the data blocks corresponding to all the data block identifiers in the delay queue in the data node.

The client 720 may include a device for deleting file in distributed data warehouse, where the device for deleting file in distributed data warehouse may include a third sending module 721.

The third sending module 721 is configured to send to the third receiving module 748 of the management node 740, an instruction for deleting a specified file; after the third receiving module 748 of the management node 740 receives the instruction for deleting the specified file, the second determining module 742 may determine for each data node the data block which belongs to the specified file and is stored in the data node 760, based on a prestored correspondence relation between a file and a data block identifier and a mapping from the data block identifier to the data node determined based on the heartbeat report sent by the data node; the second sending module 743 adds, to a heartbeat return to be sent to the acquisition module 761 of the data node 760, a deleting instruction carrying the data block identifier of the data block so that the acquisition 761 of the data node 760 may receive the deleting instruction; the storing module 762 stores the data block identifier into a delay queue; the deleting module 763 deletes the data block corresponding to the data block identifier stored in the delay queue after a condition is met.

In a tenth possible implementation of the embodiment, the device for deleting file in distributed data warehouse in the client 720 may further include a checking module 722, a third determining module 723 and a first issuing module 724.

The checking module 722 is configured to check a parameter of occupation sent to the sixth receiving module 747 in the management node 740 by each data node 760, where the parameter of occupation includes a delay deleting storage space and a delay deleting percentage, where the delay deleting storage space refers to a storage space occupied by the data blocks corresponding to all the data block identifiers in the delay queue of the data node, and the delay deleting percentage refers to a percentage of the entire storage space of the data node occupied by the delay deleting storage space.

The third determining module 723 is configured to determine whether to send to at least one data node 760 an emptying instruction for emptying the data blocks corresponding to all the data block identifiers in the delay queue in the data node 760.

The first issuing module 724 is configured to send the emptying instruction to the second deleting unit 763b of the determined data node 760 in a case that the third determining module 723 determines to send the emptying instruction to at least one data node 760.

In a eleventh possible implementation of the embodiment, the device for deleting file in distributed data warehouse in the client 720 may further include a second issuing module 725.

The second issuing module 725 is configured to send to the second receiving module 769 of the data node 760 a time configuration instruction carrying a specified time length, where the time configuration instruction is utilized in dynamic configuration of the predetermined time threshold in the data node, such that the updating module 7610 of the data node 760 may update the predetermined time threshold to the specified time length based on the time configuration instruction.

In a twelfth possible implementation of the embodiment, the device for deleting file in distributed data warehouse in the client 720 may further include a fourth sending module 726.

The fourth sending module 726 is configured to send to the fifth receiving unit 744 of the management node 740 a file recovering instruction for recovering the specified file, so that after the fifth receiving unit 744 of the management node 740 receives the file recovering instruction, the first recovering module 745 may recover an eligible first correspondence relation, where the eligible first correspondence relation refers to a first correspondence relation which is backed-up before the deleting instruction is sent and a time point for backup is closest to a time point of sending the deleting instruction, where the first correspondence relation is a relation between the specified file and a data block identifier of a data block in the specified file. The second recovering module 746 recovers a second correspondence relation, where the second correspondence relation refers to a mapping from the data block identifier to the data node 760.

It may be noted that, the client 720, the management node 740 and the data node 760 may be implemented independently.

Figure 8:
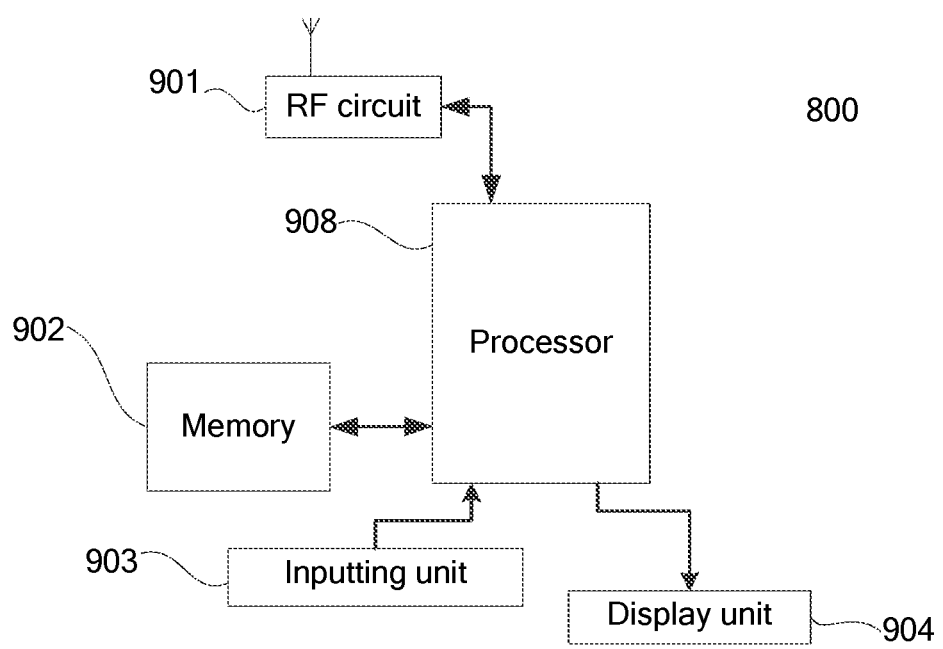
FIG. 8 is a schematic diagram of a hardware structure of a node provided according to an embodiment of the invention.

In an embodiment of the invention, the management node or the data node in the distributed data warehouse may be the node 800 having a structure shown in FIG. 8. The node 800 may include a Radio Frequency (RF) circuit 901, a memory 902 including one or more computer-readable storage medium, a inputting unit 903 and a processor 908 including one or more processing cores. Those skilled in the art may understand that, the structure shown in FIG. 8 may include the components more or less than that shown in FIG. 8, or certain components may be integrated, or the components may be arranged in different manners.

The memory 902 is configured to store software program, module and data block associated with the file in the distributed data warehouse. The processor 908 may run the software program and the module stored in the memory 902 to execute different functional applications and data processing. The memory 902 may mainly include a program storing area and a data storing area, where the program storing area may store an operating system, an application required by at least one function, etc. The data storing area may store the data created based on the usage of the node 800. In addition, the memory 902 may include a high speed random access memory or a nonvolatile memory, e.g., at least one disk memory, a flash memory, or other nonvolatile solid memory. Correspondingly, the memory 902 may further include a memory controller to provide accesses to the processor 908 and the inputting unit 903.

The inputting unit 908 is configured to receive the input figure or character and generate the signal input of keyboard, mouse, operating level, optical input or trackball relevant to functional control and user setting. In an embodiment of the invention, the inputting unit 903 may include a touch-sensitive surface or other inputting devices.

The display unit 904 is configured to display information input by a user, information provided for the user and graphic user interfaces of the device, where the graphic user interfaces may include graphics, text, icon, video or other combinations thereof. The display unit 904 may include a display panel. Optionally, the display panel may be configured with Liquid Crystal Display (LCD), Organic Light-Emitting Diode (OLED), etc. Further more, the touch-sensitive surface may cover the display panel. In a case that the touch-sensitive surface detects a touch operation over or around, the touch operation may be sent to the processor 908, such that a type of the touch event may be determined. Then the processor 908 provides a relevant video output at the display panel based on the type of the touch event. Obviously, the touch-sensitive surface and the display panel realize the input and output functions as two independent components. However, in certain embodiments, the touch-sensitive surface and the display panel are integrated to realize the input and output functions.

The processor 908 is a control center of the node 800, which executes different functions and process data by running or executing software programs and/or modules stored in the memory 902 or by calling the data stored in the memory 902. The processor 908 may integrate with an application processor or a modulation-demodulation processor. The application processor mainly processes the operating system, the user interface, the application program, etc. The modulation-demodulation processor mainly processes a wireless communication. It may be understood that the modulation-demodulation processor may also not integrated to the processor 908.

In the embodiment of the invention, the processor 908 of the device may load to the memory 902, executable files corresponding to processes of one or more application programs, and the processor 908 may run the application programs stored in the memory 902, to realize different functions such as suspending a deleting instruction, storing the data block identifiers into a delay queue, deleting the data block corresponding to the data block identifier after a condition is met, reporting information and performing different calculations, etc.

To sum up, in the system for deleting file in distributed data warehouse provided according to the embodiment of the invention, a data node receives a deleting instruction carrying a data block identifier from a management node, stores the data block identifier into a delay queue, and deletes a data block corresponding to the data block identifier stored in the delay queue after a condition is met, thereby resolving the technical issue that a file deleted by misoperation may not be recovered by setting the trash in the NameNode in some cases and a data security of a Hadoop system is lowered. After receiving the deleting instruction, the data node does not immediately delete the specified data block, but delays the deletion for a period, during which the user may recover the data blocks after finding that the deleting is a misoperation, thereby significantly ensuring the data security of the Hadoop system.

It may be noted that, the division of the functional modules is exemplary. In practical application, the functions may be realized by different functional modules as needed, i.e., the internal structures of a management node, a data node and a client may be divided into different functional modules to realize a few or all of the functions. In addition, the device for deleting file in distributed data warehouse is based on the same concept as that of the method for deleting file in distributed data warehouse and the method embodiment may be referred to in implementing the device.

Serial numbers of the embodiments are only for illustration, merits of the embodiments may not be reflected by the serial numbers.

It should be understood by those skilled in the art that all or some of the steps in the methods according to the embodiments of the disclosure may be performed by a corresponding hardware instructed with a program. The program may be stored in a computer readable storage medium. The computer readable storage medium may include Read Only Memory (ROM), Random Access Memory (RAM), magnetic disk, Compact Disk, etc.

The described embodiments are merely preferred embodiments of the disclosure. The embodiments are not intended to limit the disclosure. Any change, equivalent replacement, modification, etc., without departing from the spirit and principle of the disclosure should fall in the scope of protection of the disclosure.

The invention claimed is:

1. A method for managing file in distributed data warehouse, comprising:
   acquiring, by a data node, a deleting instruction carrying a data block identifier, wherein the deleting instruction is sent by a management node;
   suspending, by the data node, the deleting instruction; and
   deleting, by the data node, a data block corresponding to the data block identifier after a condition is met;
   wherein the process of suspending, by the data node, the deleting instruction comprises storing the data block identifier into a delay queue;
   wherein the process of deleting, by the data node, the data block corresponding to the data block identifier after the condition is met comprises:
      deleting, by the data node, data blocks corresponding to all the data block identifiers in the delay queue in response to an emptying instruction sent by a client for emptying the data blocks corresponding to all the data block identifiers in the delay queue wherein before deleting the data blocks corresponding to all the data block identifiers in the delay queue in response to an emptying instruction sent by a client for emptying the data blocks corresponding to all the data block identifiers in the delay queue, the method further comprises:
      determining data blocks in the data node corresponding to all the data block identifiers in the delay queue;
      calculating a parameter of occupation of the determined data blocks in the data node; and
      sending the parameter of occupation to the management node, wherein the client determines after checking the parameter of occupation whether to send to the data node the emptying instruction for emptying the data blocks corresponding to all the data block identifiers in the delay queue;
      wherein the parameter of occupation comprises a delay deleting storage space and a delay deleting percentage, the process of calculating a parameter of occupation of the determined data blocks in the data node comprises:
      calculating a storage space occupied by the determined data blocks in the data node as the delay deleting storage space; and
      calculating a percentage of an entire storage space of the data node occupied by the delay deleting storage space as the delay deleting percentage.

2. The method according to claim 1, wherein the process of deleting, by the data node, a data block corresponding to the data block identifier after a condition is met comprises:
   deleting, by the data node, the data block corresponding to the data block identifier in a case that a period since the data block identifier is stored into the delay queue reaches a predetermined time threshold.

3. The method according to claim 1, wherein after storing the data block identifier into the delay queue, the method further comprises:
   receiving a recovering instruction sent by the management node for recovering the data block corresponding to the data block identifier stored in the delay queue; and
   sending to the management node a report carrying data block identifiers of all the data blocks stored in the data node, so that the management node creates a mapping from the data block identifier to the data node based on the data block identifiers in the received report.

4. The method according to claim 2, wherein the method further comprises:
   receiving a time configuration instruction carrying a specified time length sent by the client, wherein the time configuration instruction is utilized in dynamic configuration of the predetermined time threshold; and
   updating the predetermined time threshold to the specified time length based on the time configuration instruction.

5. The method according to claim 3, wherein the method further comprises:
   receiving a time configuration instruction carrying a specified time length sent by the client, wherein the time configuration instruction is utilized in dynamic configuration of the predetermined time threshold; and
   updating the predetermined time threshold to the specified time length based on the time configuration instruction.

6. A method for managing file in distributed data warehouse, comprising:
   receiving from a client an instruction for deleting a specified file;
   determining, by a management node, a data block which belongs to the specified file and is stored in a data node;
   sending to the data node, by the management node, a deleting instruction carrying a data block identifier of the data block, wherein the deleting instruction is suspended by the data node, until the data node deletes the data block corresponding to the data block identifier after a condition is met;
   receiving a file recovering instruction sent by the client for recovering the specified file;
   recovering an eligible first correspondence relation, wherein the eligible first correspondence relation is a first correspondence relation which is backed-up before the deleting instruction is sent and a time point for backup is closest to a time point of sending the deleting instruction, and the first correspondence relation comprises a relation between the specified file and a data block identifier of a data block in the specified file; and
   recovering a second correspondence relation, wherein the second correspondence relation is a mapping from the data block identifier of the data block to the data node storing the data block;
   wherein the method further comprises:
      sending to the data node an emptying instruction for emptying the data blocks corresponding to all the data block identifiers in the delay queue; and
      receiving a parameter of occupation sent by the data node, wherein the parameter of occupation comprises a delay deleting storage space and a delay deleting percentage, wherein the delay deleting storage space is a storage space occupied by the data blocks corresponding to all the data block identifiers in the delay queue of the data node, and the delay deleting percentage is a percentage of the entire storage space of the data node occupied by the delay deleting storage space, such that the client determines after checking the parameter of occupation whether to send to the data node an emptying instruction for emptying the data blocks corresponding to all the data block identifiers in the delay queue.

7. The method according to claim 6, wherein the data block identifier is stored into a delay queue by the data node, wherein the process of recovering the second correspondence relation comprises:
sending to the data node a recovering instruction for recovering the data block corresponding to the data block identifier stored in the delay queue, wherein the data node sends to the management node a report carrying data block identifiers of all the data blocks stored in the data node after receiving the recovering instruction;
receiving the report sent by the data node; and
creating a mapping from the data block identifier to the data node based on the data block identifiers in the received report.

8. A method for managing file in distributed data warehouse, wherein the method comprises:
sending to a management node an instruction for deleting a specified file, wherein the instruction for deleting the specified file is utilized by the management node to determine a data block which belongs to the specified file and is stored in a data node, and the management node sends to the data node a deleting instruction carrying a data block identifier of the data block, wherein the deleting instruction is suspended by the data node, until the data node deletes the data block corresponding to the data block identifier after a condition is met;
wherein the data block identifier is stored into a delay queue by the data node, the method further comprises:
checking a parameter of occupation sent to the management node by each data node, wherein the parameter of occupation comprises a delay deleting storage space and a delay deleting percentage, wherein the delay deleting storage space is a storage space occupied by the data blocks corresponding to all the data block identifiers in the delay queue of the data node, and the delay deleting percentage is a percentage of the entire storage space of the data node occupied by the delay deleting storage space;
determining whether to send to the data node an emptying instruction for emptying the data blocks corresponding to all the data block identifiers in the delay queue of the data node; and
sending the emptying instruction to the data node in a case that it is determined to send the emptying instruction to the data node.

9. The method according to claim 8, wherein the method further comprises:
sending to the data node a time configuration instruction carrying a specified time length, wherein the time configuration instruction is utilized in dynamic configuration of the predetermined time threshold, such that the data node updates the predetermined time threshold to the specified time length based on the time configuration instruction and deletes the data block corresponding to the data block identifier after the predetermined time threshold is reached.

10. The method according to claim 8, wherein the method further comprises:
sending to the management node a file recovering instruction for recovering the specified file, such that the management node recovers an eligible first correspondence relation and recovers a second correspondence relation after receives the file recovering instruction, wherein the eligible first correspondence relation is a first correspondence relation which is backed-up before the deleting instruction is sent and a time point for backup is closest to a time point of sending the deleting instruction, the first correspondence relation comprises a relation between the specified file and a data block identifier of a data block in the specified file, the second correspondence relation is a mapping from the data block identifier of the data block in the specified file to the data node.

* * * * *